United States Patent [19]

Tabata et al.

[11] Patent Number: 5,294,146
[45] Date of Patent: Mar. 15, 1994

[54] ACTIVE SUSPENSION OF VEHICLE HAVING SYSTEM OF COMPENSATION FOR CORNERING FORCE

[75] Inventors: Masaaki Tabata, Toyota; Toshiaki Hamada, Okazaki, both of Japan

[73] Assignees: Toyota Jidosha Kabushiki Kaisha; Aisin Seiki Kabushiki Kaisha, both of Aichi, Japan

[21] Appl. No.: 872,897

[22] Filed: Apr. 23, 1992

[30] Foreign Application Priority Data

May 2, 1991 [JP] Japan .................. 3-130397

[51] Int. Cl.$^5$ .............................................. B60G 17/00
[52] U.S. Cl. .................. 280/707; 364/424.05
[58] Field of Search .................. 280/707, 689, 772; 364/424.05

[56] References Cited

U.S. PATENT DOCUMENTS

| | | |
|---|---|---|
| 4,924,392 | 5/1990 | Kurosawa . |
| 4,924,393 | 5/1990 | Kurosawa . |
| 4,943,084 | 7/1990 | Fukunaga et al. . |
| 4,975,849 | 12/1990 | Ema .................. 280/707 X |
| 5,013,062 | 5/1991 | Yonekawa et al. . |
| 5,024,459 | 6/1991 | Kokubo et al. . |
| 5,043,893 | 8/1991 | Aburaya et al. .......... 280/707 X |
| 5,069,475 | 12/1991 | Yonekawa et al. .......... 280/707 |
| 5,071,158 | 12/1991 | Yonekawa et al. . |
| 5,085,458 | 2/1992 | Kii et al. .................. 280/707 |
| 5,103,397 | 4/1992 | Ikemoto et al. . |
| 5,104,143 | 4/1992 | Yonekawa . |
| 5,119,297 | 6/1992 | Burma et al. .................. 280/707 X |
| 5,162,995 | 11/1992 | Ikemoto et al. .................. 280/707 X |

FOREIGN PATENT DOCUMENTS

| | | |
|---|---|---|
| 0285153 | 10/1988 | European Pat. Off. . |
| 0348817 | 1/1990 | European Pat. Off. . |
| 3932476 | 4/1990 | Fed. Rep. of Germany . |
| 0193907 | 8/1986 | Japan .................. 280/707 |
| 3106133 | 5/1988 | Japan .................. 280/707 |
| 3159118 | 7/1988 | Japan .................. 280/707 |
| 0240313 | 9/1989 | Japan .................. 280/707 |
| 2-27406 | 1/1990 | Japan . |
| 0038122 | 2/1990 | Japan .................. 280/707 |
| 2-274606 | 11/1990 | Japan . |

*Primary Examiner*—Brian L. Johnson
*Attorney, Agent, or Firm*—Oliff & Berridge

[57] ABSTRACT

In an active suspension of a vehicle suspending a vehicle body on vehicle wheels by actuators in combination with a suspension mechanism which converts cornering forces acting at the vehicle wheels during a turn of the vehicle to a vertical force exerted to the vehicle body, the suspension force to be generated by the actuators is modified based upon an active suspension calculation taking the lateral acceleration due to the turn of the vehicle into consideration, so as to compensate for the vertical force, so that the active suspension control is not undesirably exaggerated by the effect of the cornering forces.

7 Claims, 11 Drawing Sheets

ACTIVE SUSPENSION OF VEHICLE HAVING SYSTEM OF COMPENSATION FOR CORNERING FORCE

BACKGROUND OF THE INVENTION

1. Field of the Invention

The present invention relates to a suspension of a vehicle such as an automobile, and more particularly, to an active suspension of a vehicle.

2. Description of the Prior Art

A type of hydraulic active suspension of a vehicle such as an automobile is known, as described in, for example, Japanese Patent Laid-open Publication 2-27406, which comprises hydraulic actuators each provided for each vehicle wheel so as to increase or decrease the height of the vehicle body at a portion thereof corresponding to each vehicle wheel according to supply or exhaust of working fluid thereto or therefrom, control valves each controlling the supply or exhaust of the working fluid to or from each hydraulic actuator, an acceleration detection means for detecting acceleration of the vehicle, and a control means for controlling the control valves based upon a control parameter related with the acceleration of the vehicle, wherein the pressure in each actuator is controlled, in an aspect thereof, according to a parameter proportional to a lateral acceleration of the vehicle body when the vehicle makes a turn so that the rolling of the vehicle body is suppressed.

By such an active suspension it is possible to suppress the rolling of the vehicle body during a turn of the vehicle, as the pressure in each actuator is controlled according to the parameter proportional to the lateral acceleration of the vehicle body.

However, when a vertical force is exerted to a vehicle body during a turn of a vehicle due to a cornering force at a vehicle wheel, the vehicle body may heave up or dive down according to such a vertical force. This phenomenon will be seen in both the passive and active suspensions. However, in the active suspension which operates to suppress the rolling of the vehicle body by a control of the pressure in the hydraulic actuator, the phenomenon becomes more noticeable.

Figure 14:
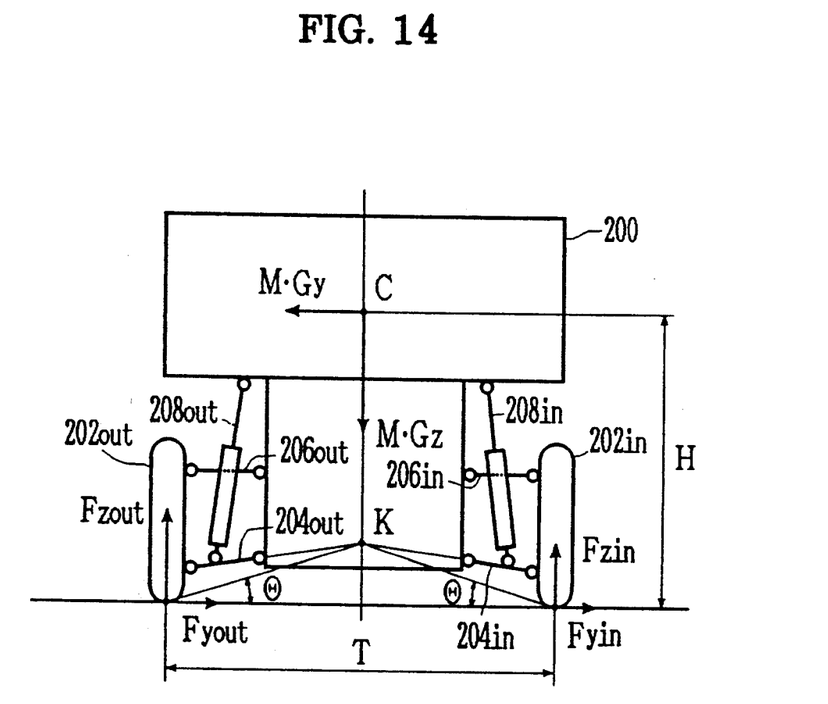
FIG. 14 is a view to illustrate the phenomenon of a vehicle body heave up or dive down by the action of a vertically upward or downward pointed force due to the cornering force at a vehicle wheel.

FIG. 14 is an illustration to explain the above-mentioned phenomenon.

Referring to FIG. 14, denoting the mass of a vehicle body 200 by M, a lateral acceleration of the vehicle body by Gy, a lateral force at an outside-in-turn vehicle wheel 202out by Fyout, and a lateral force at an inside-in-turn vehicle wheel 202in by Fyin, respectively, the following equilibrium of force in the lateral orientation is obtained:

$$M \cdot Gy = Fyout + Fyin \quad (1)$$

Further, denoting a ground contact force at the outside-in-turn vehicle wheel 202out by Fzout, a ground contact force at the inside-in-turn vehicle wheel 202in by Fzin, and the acceleration of gravity by Gz, respectively, the following equilibrium of force in the vertical orientation is obtained:

$$M \cdot Gz = Fzout + Fzin \quad (2)$$

Further, denoting the height of the mass center C of the vehicle body 200 by H, and the tread by T, respectively, the following equilibrium of the roll moment is obtained:

$$M \cdot Gy \cdot H = (Fzout - Fzin) \cdot T/2 \quad (3)$$

$$Fzout - Fzin = 2M \cdot Gy \cdot H/T \quad (3')$$

Figure 15:
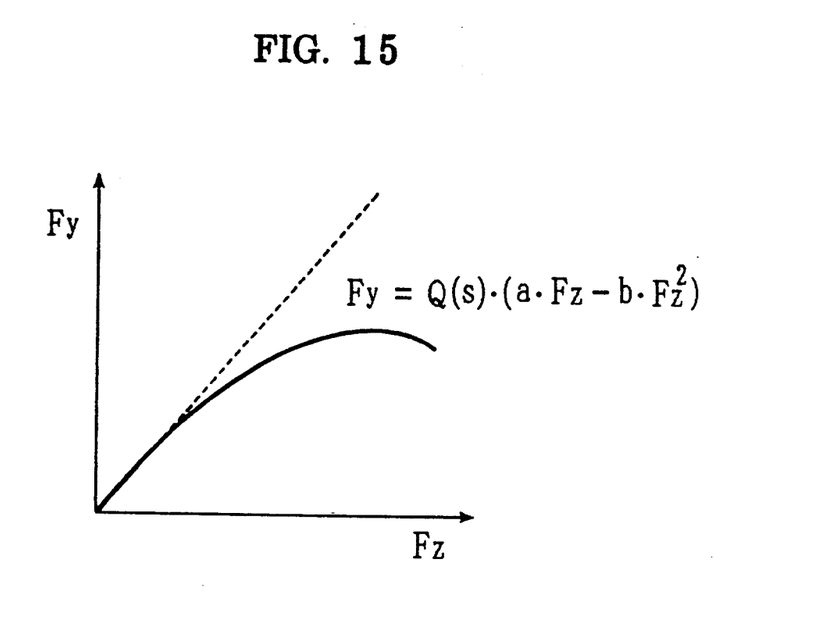
FIG. 15 is a graph showing relation between the lateral force Fy and the ground contact force Fz at a vehicle wheel.

Theoretically, the ratio of the lateral force Fy (i.e. Fyout or Fyin) to the ground contact force Fz (i.e., Fzout or Fzin) acting at a vehicle wheel is a function of the slip angle of the vehicle wheel or its tire. However, in fact, when the turning rate of the vehicle increases, said ratio is deformed as shown by a solid curve in FIG. 15. Therefore, denoting said function of the slip angle as Q(s), the cornering force performance is approximated to, with certain constants a and b, as follows:

$$Fy = Q(s) \cdot (a \cdot Fz - b \cdot Fz^2) \quad (4)$$

Now, in the suspension structure shown in FIG. 14, in which the vehicle wheel 202 is connected with the vehicle body 200 by a double wishbone type suspension link including a lower arm 204 and an upper arm 206, and a hydraulic actuator 208 for the active suspension is connected between the lower arm 204 and the vehicle body 200, the point of intersection, K, of the axis of the outside-in-turn lower arm 204out and the axis of the inside-in-turn lower arm 204in may be considered as a point of action of force at which the side forces acting at the outside-in-turn and inside-in-turn vehicle wheels during a turning of the vehicle, i.e. the cornering forces, exert a vertical force to the vehicle body so as to cause it heave up or dive down, by overcoming the suspension forces exerted by the actuators.

Denoting the angle which the point K expands with the ground contact point of the vehicle wheel relative to the ground surface by $\theta$ and assuming that this angle is substantially the same with respect to the opposite sides vehicle wheels, a vertical force which is exerted to the vehicle body at point K due to the cornering forces at the outside-in-turn and inside-in-turn vehicle wheels is expressed by:

$$(Fyout - Fyin) \tan\theta$$

When the ratio of the distance between an inboard end of the lower arm 204 pivotably connected with the vehicle body 200 and a pivot joint of the lower arm 204 and a lower end of the actuator 208 to the distance between the inboard pivot joint end and an outboard end of the lower arm 204 pivotably connected with a wheel carrier is denoted by Ra, the above-mentioned vertical force affects the operation of the actuators 208 under the lever ratio Ra as follows:

$$Fj = (Fyout - Fyin)(\tan\theta)/Ra \quad (5)$$

This vertical force Fj will be called herein "jackup force". From the condition according to equation (4), $$Fyout = Q(s) \cdot (a \cdot Fzout - b \cdot Fzout^2) \quad (6)$$

$$Fyin = Q(s) \cdot (a \cdot Fzin - b \cdot Fin^2) \quad (7)$$

From equations (6) and (7), $$Fyout - Fyin = Q(s) \cdot \{a \cdot (Fzout - Fzin) - b \cdot (Fzout^2 - Fin^2)\}$$
$$= Q(s) \cdot (Fzout - Fzin)\{a - b \cdot (Fzout + Fzin)\}$$

From equations (1), (6) and (7), $$M \cdot Gy = Q(s) \cdot \{a \cdot (Fzout + Fzin) - b \cdot (Fzout^2 + Fin^2)\}$$

Therefore, $$Q(s) = M \cdot Gy / \{a \cdot (Fzout + Fzin) - b \cdot (Fzout^2 + Fin^2)\}$$

Therefore, $$Fyout - Fyin = M \cdot Gy \cdot (Fzout - Fzin)\{a - b \cdot (Fzout + Fzin)\}/\{a \cdot (Fzout + Fzin)\}b \cdot (Fzout^2 + Fin^2)\} \quad (9)$$

From equations (2) and (3), $$Fzout = M \cdot Gz/2 + M \cdot Gy \cdot H/T$$

$$Fzin = M \cdot Gz/2 - M \cdot Gy \cdot H/T$$

Therefore, $$Fzout^2 + Fzin^2 = M^2 \cdot Gz^2/2 + 2M^2 \cdot Gy^2 \cdot H^2/T^2 \quad (10)$$

By substituting equations (2), (3') and (10) for equation (9), $$Fyout - Fyin = \{2M \cdot H \cdot (a - b \cdot M \cdot Gz)/T\} \cdot Gy^2 / \{(a \cdot Gz - b \cdot M \cdot Gz^2/2) - (2b \cdot M \cdot H^2/T^2) \cdot Gy^2\}$$

Therefore, $$Fj = \{2M \cdot H \cdot (a - b \cdot M \cdot Gz)/T\} \cdot (\tan\theta) \cdot Gy^2 / \{(a \cdot Gz - b \cdot M \cdot Gz^2/2) - (2b \cdot M \cdot H^2/T^2) \cdot Gy^2\}/Ra$$

Substituting u for $\{2M \cdot H \cdot (a-b \cdot M \cdot Gz)/T\} \cdot \tan\theta$, v for $(a \cdot Gz - b \cdot M \cdot Gz^2/2) \cdot Ra$, and w for $(2b \cdot M \cdot H^2/T^2) \cdot Ra$, $$Fj = u \cdot Gy^2 / (v - w \cdot Gy^2)$$

Figure 16:
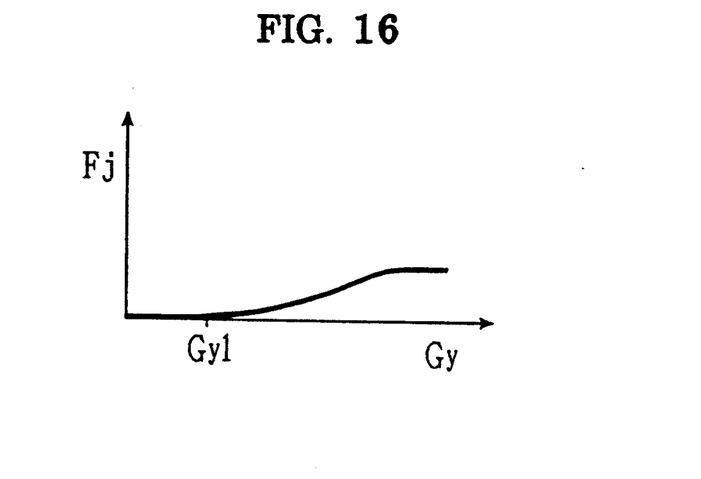
FIG. 16 is a graph showing a relation between the absolute value of the lateral acceleration of a vehicle body and the absolute value of the jackup force Fj.

Since in equation (4) "b" is generally very small as compared with "a", the general performance of the jackup force Fj due to the lateral acceleration Gy is such as shown in FIG. 16.

As will be seen from FIG. 16, the jackup force Fj is substantially zero when the absolute value of the lateral acceleration Gy is less than a certain moderate value Gy1, but increases gradually when the lateral acceleration increases beyond Gy1.

According to each particular geometry of the suspension mechanism like the double wishbone type link in the example shown in FIG. 14, the value of Fj becomes positive or negative for an increase of the lateral acceleration in the same direction.

SUMMARY OF THE INVENTION

In view of the above-mentioned problems of the exaggerated heaving up or diving down of the vehicle body due to the effect of the cornering force acting at the vehicle wheels during a turn of the vehicle in the vehicles equipped with the conventional active suspensions, it is an object of the present invention to provide an improved active suspension which avoids such heaving up or diving down of the vehicle body due to the cornering force during a turning of the vehicle.

According to the present invention, the above-mentioned object is accomplished by an active suspension of a vehicle suspending a vehicle body on vehicle wheels with a suspension force generated therein in combination with a suspension mechanism which converts cornering forces acting at the vehicle wheels during a turn of the vehicle to a vertical force exerted to the vehicle body, comprising actuators each provided for each of said vehicle wheels so as to generate said suspension force while increasing or decreasing the height of the vehicle body at a portion thereof corresponding to each vehicle wheel, vehicle height detection means for detecting height of the vehicle body at a portion thereof corresponding to each of said vehicle wheels, a lateral acceleration detection means for detecting lateral acceleration of the vehicle body, and a control means controlling said actuators in reference to the detected vehicle body height to obtain a desired attitude of the vehicle body, wherein said control means modifies the control of said actuators according to the lateral acceleration of the vehicle body so as to change said suspension forces generated by said actuators in compensation for said vertical force exerted to the vehicle body due to the cornering force.

When the actuators in the active suspension according to the above-mentioned construction are hydraulic actuators, said control means may include control valves each controlling a supply and an exhaust of a working fluid to and from each of said hydraulic actuators so as to generate said suspension force while increasing or decreasing the height of the vehicle body at the portion thereof corresponding to each vehicle wheel, and said control means may modify the control of said control valves so as to change the pressure supplied to each hydraulic actuator in compensation for said vertical force exerted to the vehicle body due to the cornering force.

In this case, said control means may control said control valves so as to supply each of said actuators with the working fluid at a pressure which is an addition of a first pressure component calculated to obtain the desired attitude of the vehicle body by excluding the effect of said vertical force due to the cornering force and a second pressure component calculated to be equivalent to said vertical force due to the cornering force, provided that said vertical force is negative when pointed vertically upward.

Further, when said suspension mechanism is a double wishbone type suspension mechanism including a lower arm, and a corresponding one of said actuators is pivotably connected at a lower end thereof with said lower arm.

BRIEF DESCRIPTION OF THE DRAWINGS

In the accompanying drawings.

DESCRIPTION OF THE PREFERRED EMBODIMENT

In the following, the present invention will be described with respect to an embodiment thereof with reference to the accompanying drawings.

Figure 1:
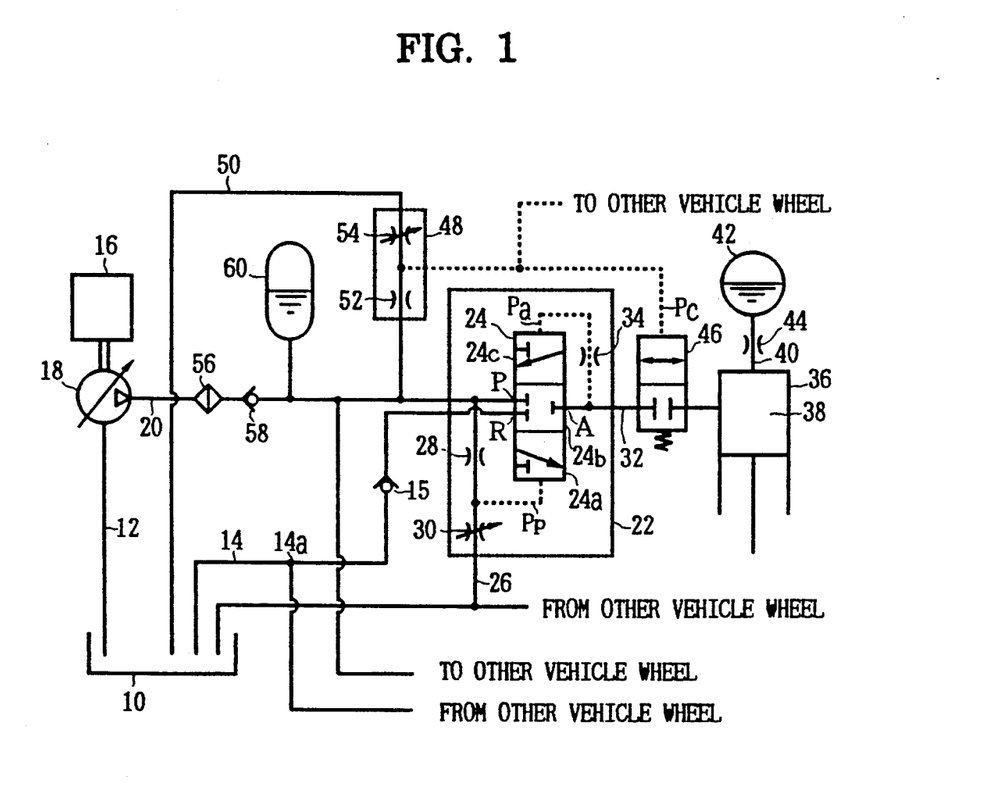
FIG. 1 is a diagrammatical illustration of an embodiment of the working fluid supply device according to the present invention combined with a hydraulic active suspension as adapted to a vehicle in which a vehicle body is exerted with a vertically upward pointed force due to the cornering force.

In FIG. 1, 10 designates a reservoir for storing oil which serves as a working fluid. A supply passage 12 extends from the reservoir 10, and a return passage 14 terminates at the reservoir 10. The supply passage 12 is connected to a suction port of a pump 18 driven by an engine 16. In the shown embodiment, the pump 18 is a variable displacement pump. A working fluid supply/delivery passage 20 extends from an outlet port of the pump 18 to a P port of a pilot-operated-3-port-3-position type switching valve 24 forming an essential part of a pressure control means 22. The return passage 14 is connected to an R port of the switching valve 24. A non return valve 15 is provided at a portion of the return passage 14 located between its end connected with the R port and a branch point 14a for connection with a similar pressure control means of another vehicle wheel, so as to allow the working fluid to flow only in the direction of return from the pressure control means 22 to the reservoir 10.

The pressure control means 22 comprises, in addition to the switching valve 24, a passage 26 connected with the supply passage 20 to return to the reservoir 10, and a constant throttle means 28 and a variable throttle means 30 provided in the passage 26. A passage 32 is connected with an A port of the switching valve 24. The switching valve 24 is a spool valve which is switched over by a balance between a pilot pressure Pp taken from the passage 26 at a position between the constant throttle means 28 and the variable throttle means 30 and a pilot pressure Pa taken from the passage 32, so that, when pressure Pp is higher than pressure Pa, the spool is shifted to a position 24a where port P is connected with port A, and when pressure Pp is equal to pressure Pa, the spool is shifted to a position 24b where all ports are disconnected from one another, and when pressure Pp is lower than pressure Pa, the spool is shifted to a position 24c where port R is connected with port A. The variable throttle means 30 varies its throttle opening area according to the electric current supplied to its solenoid so as thereby to cooperate with the constant throttle means 28 in changing the pressure Pp. A throttle means 34 is provided in a passage conducting the pilot pressure Pa.

The passage 32 extends to a working fluid chamber 38 of an actuator 36 provided for a corresponding vehicle wheel not shown in this figure. The actuator 36 is a cylinder-piston device provided between the vehicle wheel, in fact a wheel carrier or an arm member of a suspension link mechanism as in the example shown in FIG. 14, and a vehicle body not shown in this figure, and is adapted to increase or decrease the height of the vehicle body at the corresponding portion thereof according to a supply or an exhaust of the working fluid to or from the working fluid chamber 38. An air-liquid spring means 42 is connected with the working fluid chamber 38 via a passage 40 including a throttle means 44. The air-liquid spring means 42 operates as a suspension spring or an auxiliary suspension spring incorporating a damping function available by the throttle means 44.

A shutoff valve 46 is provided in the passage 32. The shutoff valve 46 is switched over by a pilot pressure Pc controlled by a pilot pressure control means 48 so as to be opened when the pilot pressure Pc is equal to or higher than a predetermined valve opening pressure and to be closed when the pilot pressure Pc is lower than the valve opening pressure. The pilot pressure control means 48 comprises a passage 50 connected with the passage 20 to exhaust a part of the working fluid toward the reservoir 10, and a constant throttle means 52 and a variable throttle means 54 provided in the passage 50, thereby proving the pilot pressure Pc at a portion of the passage 50 between these two throttle means.

A filter 56 and a non return valve 58 are provided in the passage 20 so as to filtrate and allow the working fluid to flow only from the pump 18 toward the pressure control valve 22. An accumulator 60 is connected with the passage 20 at the downstream side of the non return valve 58.

Figure 2:
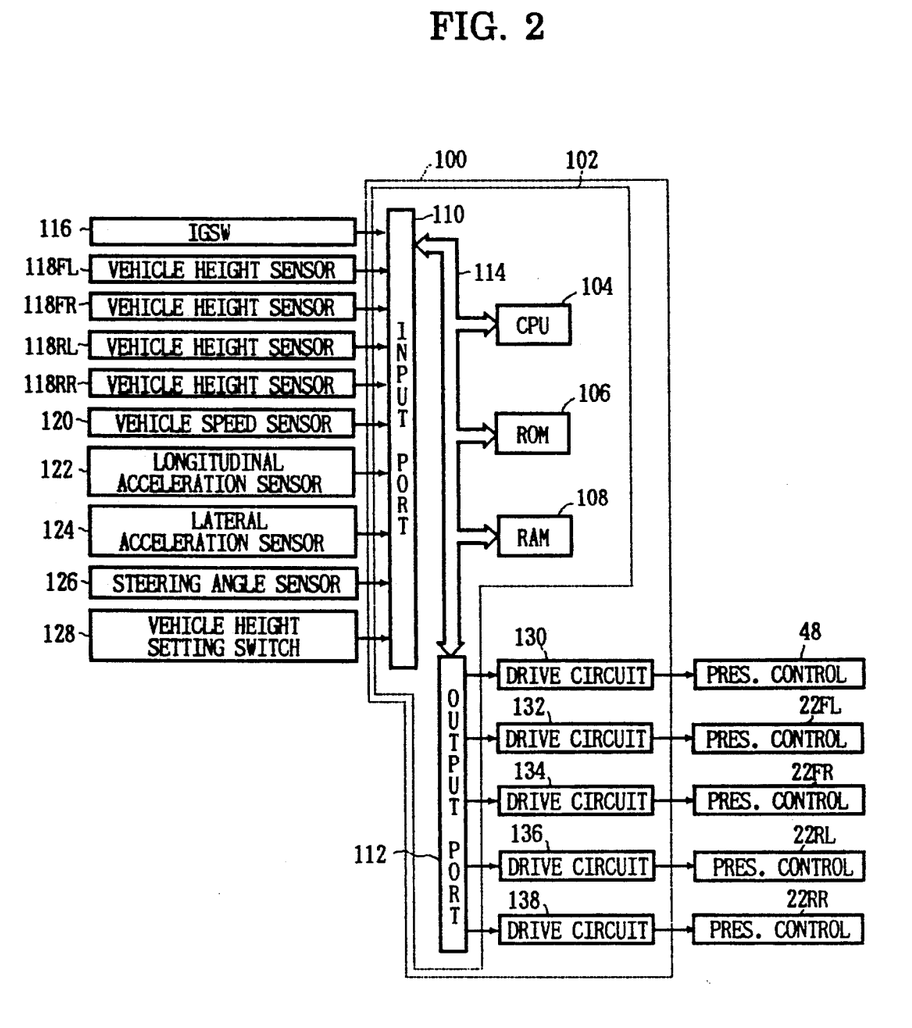
FIG. 2 is a block diagram showing an electronic control means for controlling a pilot pressure control means and pressure control means incorporated in the working fluid supply device shown in FIG. 1.

The pressure control means 22, the passage 32, the actuator 36, the air-liquid spring means 42, the throttle means 44, etc. are provided for each vehicle wheel, as is illustrated in FIG. 2 by 22FL, 22FR, 22RL and 22RR.

The pilot pressure control means 48 and the pressure control means 22FL–22RR are controlled by an electronic control means 100 shown in FIG. 2. The electronic control means 100 includes a micro computer 102 which may be of a conventional construction including a central processing unit (CPU) 104, a read only memory (ROM) 106, a random access memory (RAM) 108, an input port means 110, and an output port means 112 interconnected by a bidirectional common bus 114.

The electronic control means 100 is supplied with various input signals such as a signal from an ignition switch (IGSW) 116 indicative of on or off condition thereof, signals from vehicle height sensors 118FL, 118FR, 118RL and 118RR for front left, front right, rear left and rear right vehicle wheels indicative of corresponding vehicle heights Xi (i=fl, fr, rl and rr), a signal from a vehicle speed sensor 120 indicative of vehicle speed V, a signal from a longitudinal acceleration sensor 122 indicative of longitudinal acceleration Gx, a signal from a lateral acceleration sensor 124 indicative of lateral acceleration Gy, a signal from a steering angle sensor 126 indicative of steering angle Ast, and a signal from a vehicle height set switch 128 indicative of a vehicle height set mode such as high mode or a normal mode set thereby with respect to the vehicle height, all through the input port means 110.

Figure 3:
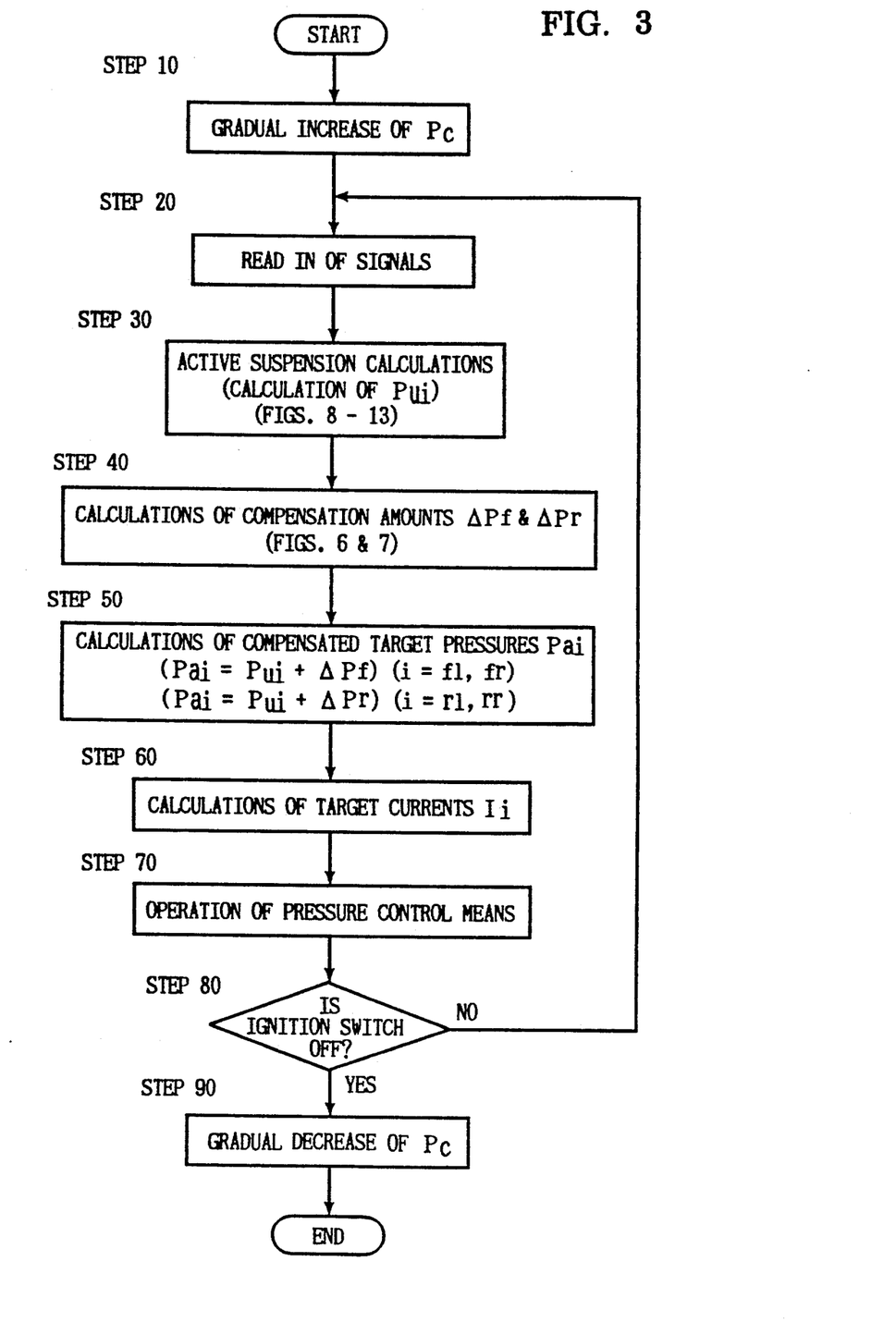
FIG. 3 is a general flowchart showing the control operation carried out by the electronic control means shown in FIG. 2.
Figure 4:
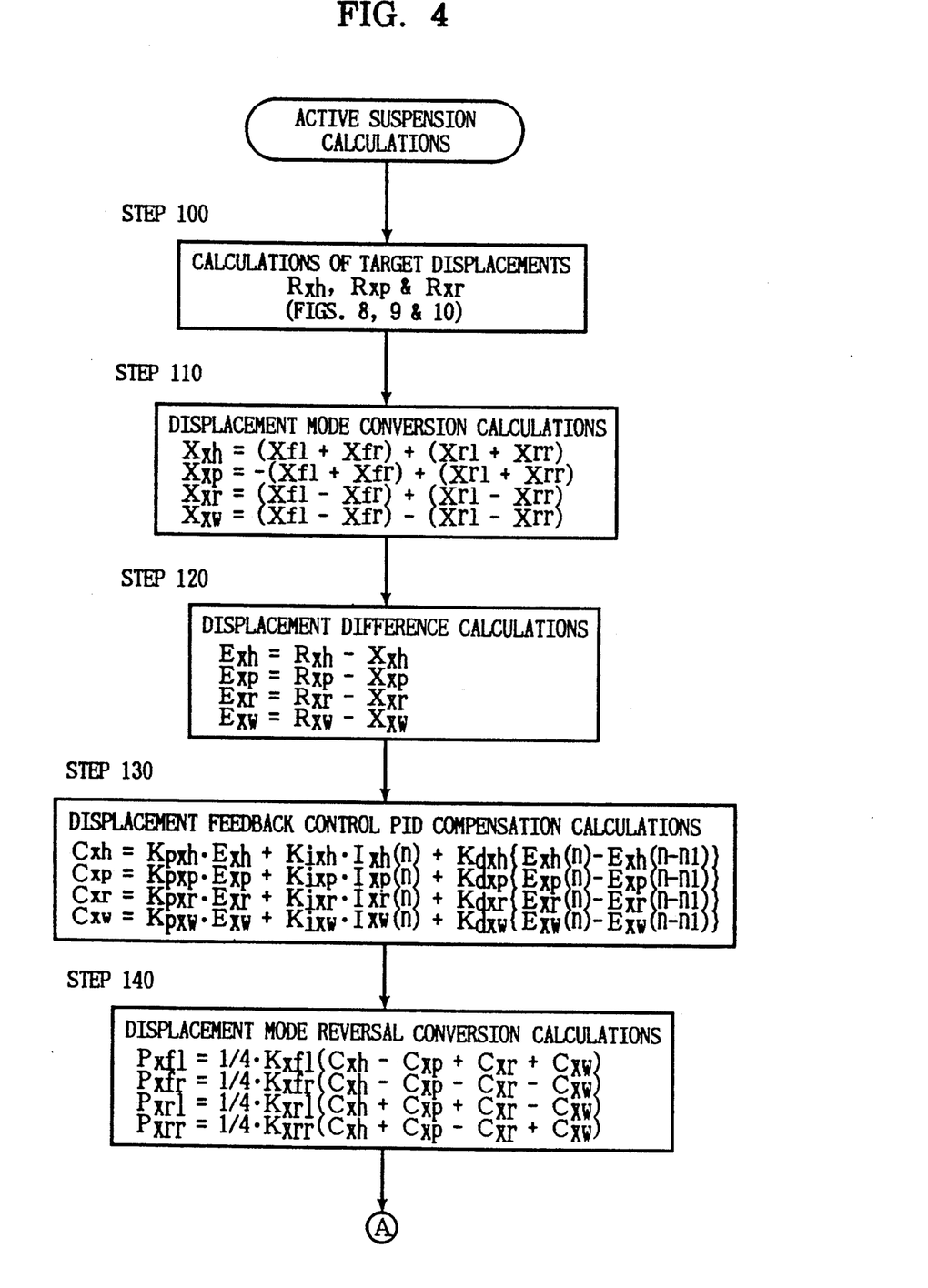
FIG. 4 is a flowchart showing a part of the routine of the active suspension calculations carried out in step 30 of the flowchart shown in FIG. 3.
Figure 5:
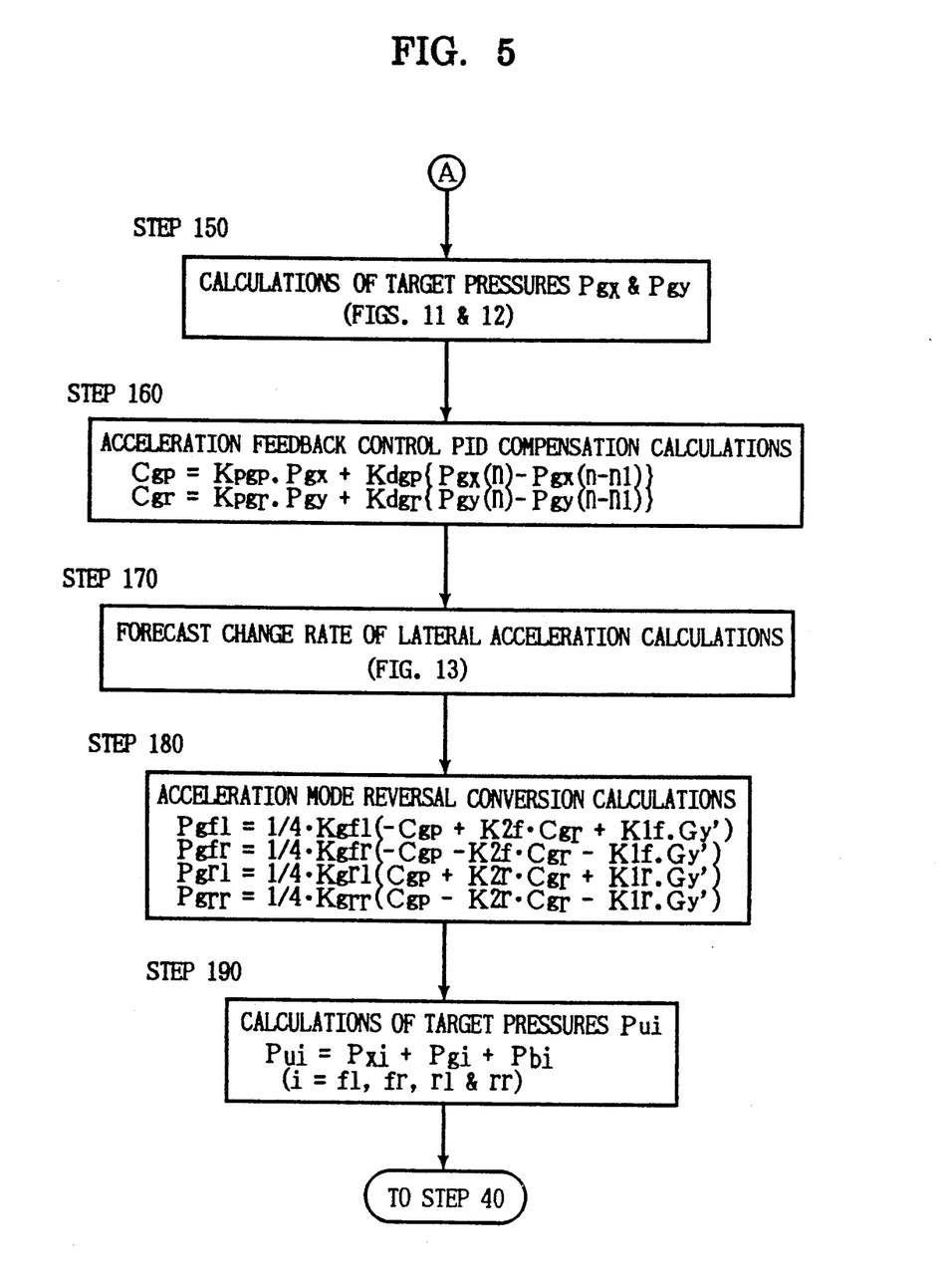
FIG. 5 is a flowchart showing a remaining part of the routine of the active suspension calculations carried out in step 30 of the flowchart shown in FIG. 3.

The input port means 110 processes these input signals to supply them as appropriately processed for use in CPU 104 and RAM 108 according to the instructions from CPU 104 which operates according to certain programs stored in ROM 106. ROM 106 stores control programs such as shown in FIGS. 3–5 in the form of control flows and maps such as shown in FIGS. 6–13 for operating CPU 104. The output port means 112 delivers, according to the instructions from CPU 104, output signals to a drive circuit 130 which operates the variable throttle means 54 of the pilot pressure control means 48 and to drive circuits 132–138 which operate the pressure control means 22FL–22RR, respectively.

In the following, the operation of the shown embodiment will be described with reference to the flowchart shown in FIG. 3. The control according to the flowchart shown in FIG. 3 is started upon a closure of the ignition switch and is terminated with a lapse of time when the ignition switch is opened.

First, in step 10, by a supply of a control signal to the solenoid of the variable throttle means 54 of the pilot pressure control means 48, so as to gradually decrease the effective passage opening of the variable throttle means 54, the pilot pressure Pc is gradually increased, and the working fluid pressure in the supply passage 20 is also increased. When the pilot pressure increases to a determinate pressure, the shutoff valve 46 starts to open, and when the shutoff valve 46 has been fully opened, the control process proceeds to a next step 20.

In step 20, the signal indicative of the on or off condition of the ignition switch 116, the signals indicative of the vehicle heights Xi detected by the vehicle height sensors 118FL, 118FR, 118RL and 118RR, the signal indicative of the vehicle speed V detected by the vehicle sensor 120, the signal indicative of the longitudinal acceleration Gx detected by the longitudinal acceleration sensor 122, the signal indicative of the lateral acceleration Gy detected by the lateral acceleration sensor 124, the signal indicative of the steering angle Ast detected by the steering angle sensor 126, and the signal indicative of the vehicle height mode set by the vehicle height set switch 128, are read in. Then the control process proceeds to step 30.

In step 30, based upon the signals read in in step 20, the active suspension calculations described hereinbelow are carried out under reference to FIGS. 8–13, so as to control the attitude of the vehicle body and the riding comfortableness performance of the vehicle, whereby target pressures Pui for the respective actuators are calculated. Then the control process proceeds to step 40.

Figure 6:
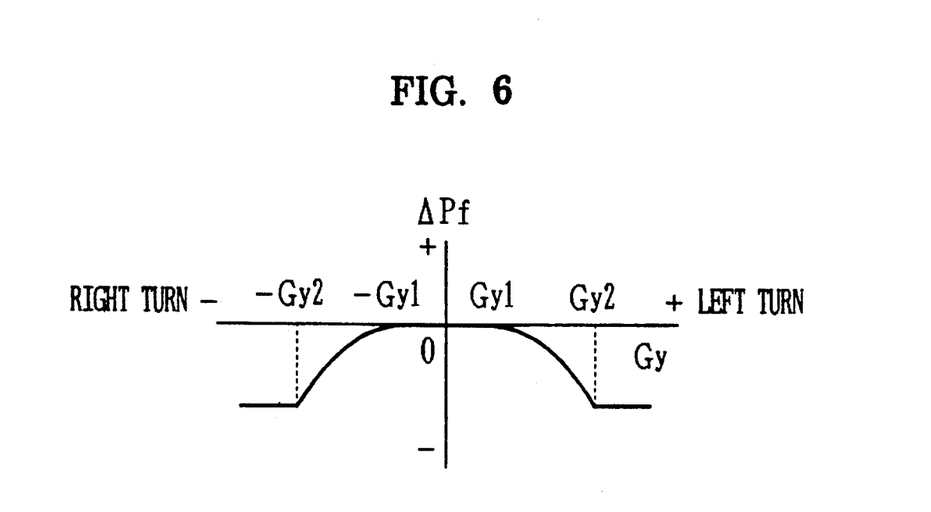
FIG. 6 is a graph showing the relation between the lateral acceleration Gy and the compensation amount ΔPf for the pressure in the actuator of a front vehicle wheel.
Figure 7:
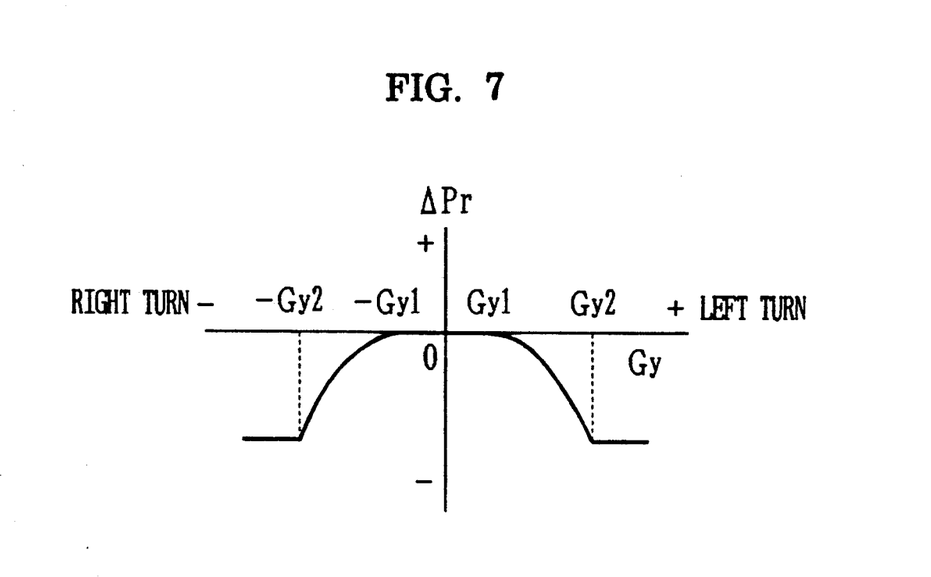
FIG. 7 is a graph showing the relation between the lateral acceleration Gy and the compensation amount ΔPr for the pressure in the actuator of a rear vehicle wheel.

In step 40, based upon the maps shown in FIGS. 6 and 7, a compensation amount $\Delta Pf$ for the target pressure in the working fluid chambers of the actuators of the two front vehicle wheels and a compensation amount $\Delta Pr$ for the target pressure in the working fluid chambers of the actuators of the two rear vehicle wheels are calculated, for compensation of the vertically pointed force exerted to the vehicle body through the suspension mechanism due to the cornering forces, i.e., the jackup force. Then the control process proceeds to step 50.

As was described above, the vertically upward pointed force exerted to the vehicle body due to the cornering forces of the vehicle wheels is substantially zero when the absolute value of the lateral acceleration Gy is less than the certain moderate value Gy1, and increases gradually when the absolute value of the lateral acceleration increases beyond Gy1. Therefore, as shown in FIGS. 6 and 7, the compensation amount $\Delta Pf$ and $\Delta Pr$ for the target pressures are substantially zero when the absolute value of the lateral acceleration Gy is less than Gy1, and increase gradually when the absolute value of the lateral acceleration increases beyond Gy1. The increase of $\Delta Pf$ and $\Delta Pr$ is limited in the control when the lateral acceleration Gy increases beyond a certain limit value Gy2.

In step 50, based upon the compensation amounts $\Delta Pf$ and $\Delta Pr$, compensated target pressures Pai are calculated according to the following equations:

$$Pai = Pui + \Delta Pf (i = fl, fr)$$

$$Pai = Pui + \Delta Pr (i = rl, rr)$$

Then the control process proceeds to step 60. In step 60, based upon the compensated target pressures Pai, target currents Ii to be supplied to the respective pressure control valves are calculated, and then the control process proceeds to step 70.

In step 70, the target currents Ii calculated in step 60 are supplied to the respective pressure control means, so that the pressure control means are operated to provide the pressures to conform to the compensated target pressures Pai. Then the control process proceeds to step 80.

In step 80, it is tested if the ignition switch 116 was switched from the on to the off state, and if the answer is "no", the control process returns to step 20, while if the answer is "yes", the control process proceeds to step 90.

In step 90, the current supplied to the solenoid of the variable throttle means 54 is so controlled that the effective passage opening thereof is gradually increased to thereby gradually lower the pilot pressure Pc. When the pilot pressure has lowered below a determinate threshold pressure, the shutoff valve 46 is closed; thus interrupting both the supply and the exhaust of the working fluid to and from the actuator.

The active suspension calculations carried out in step 30 will be described with reference to FIGS. 4, 5 and 8–13.

Figure 8:
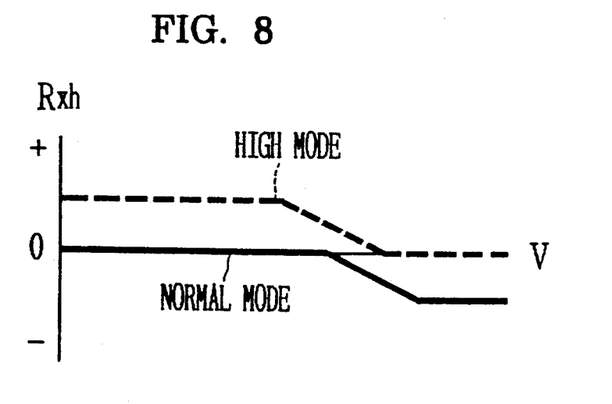
FIG. 8 is a graph showing a relation between the vehicle speed V and the target heave Rxh.
Figure 9:
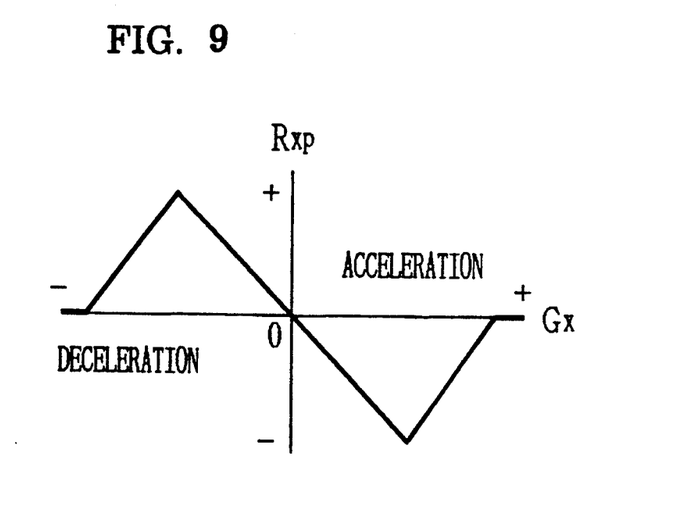
FIG. 9 is a graph showing a relation between the longitudinal acceleration Gx and the target pitch Rxp.
Figure 10:
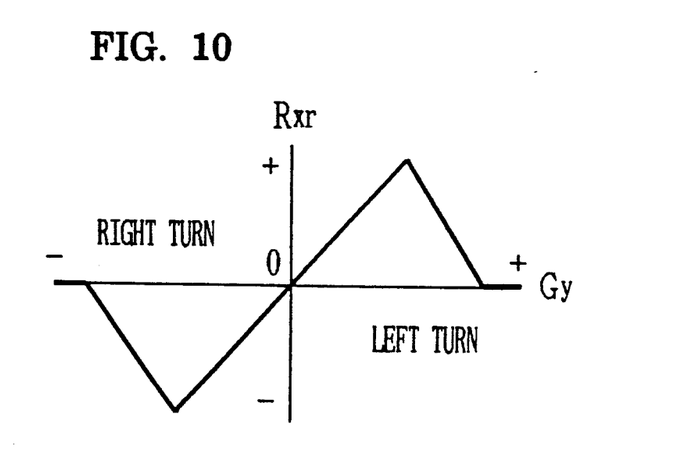
FIG. 10 is a graph showing a relation between the lateral acceleration Gy and the target roll Rxr.
Figure 11:
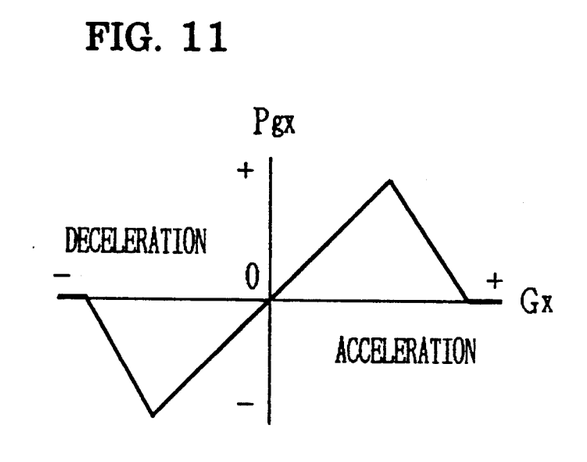
FIG. 11 is a graph showing a relation between the longitudinal acceleration Gx and the target pressure Pgx.
Figure 12:
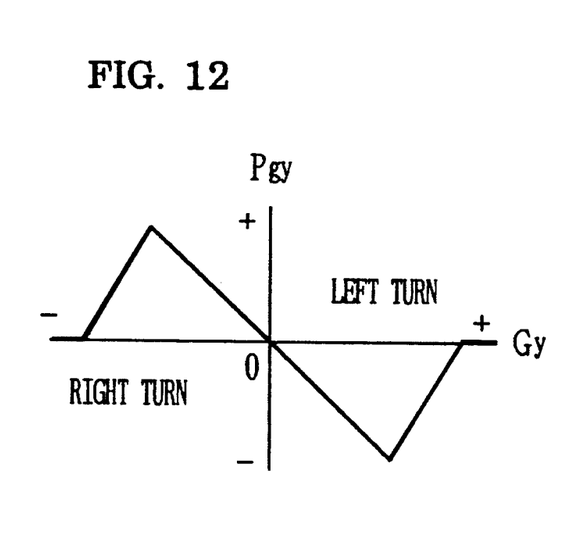
FIG. 12 is a graph showing a relation between the lateral acceleration Gy and the target pressure Pgy.

First, in step 100, target values Rxh, Rxp and Rxr of the heave, pitch and roll of the vehicle body are calculated based upon the maps shown in FIGS. 8, 9 and 10, according to the vehicle speed V detected by the vehicle speed sensor 120, the longitudinal acceleration Gx detected by the longitudinal acceleration sensor 122 and the lateral acceleration Gy detected by the lateral acceleration sensor 124. In FIG. 8, the solid and broken lines represent the performance patterns of the normal mode and the high mode, respectively, according to the vehicle height set mode. Then the control process proceeds to step 110.

In step 110, based upon the vehicle heights Xfl-Xrr at the front left, front right, rear left and rear right vehicle wheels read in in step 20, calculations for displacement mode conversion are carried out with respect to the heave (Xxh), pitch (Xxp), roll (Xxr) and warp (Xxw), according to the following equations:

$$Xxh = (Xfl + Xfr) + (Xrl + Xrr)$$

$$Xxp = -(Xfl + Xfr) + (Xrl + Xrr)$$

$$Xxr = (Xfl - Xfr) + (Xrl - Xrr)$$

$$Xxw = (Xfl - Xfr) - (Xrl - Xrr)$$

Then the control process proceeds to step 120. In step 120, the differences in the respective displacement modes are calculated according to the following equations:

$$Exh = Rxh - Xxh$$

$$Exp = Rxp - Xxp$$

$$Exr = Rxr - Xxr$$

$$Exw = Rxw - Xxw$$

In the above last equation, Rxw is a target value of the warp, and this may generally be zero, or may be the value of Xxw calculated just after the start of the control operation, or a mean value of Xxw in the past several cycles of the control operation. If the absolute value of Exw is not more than a certain limit value, Exw may be made zero. Further, Rxp and/or Rxr referred to as such performance in FIGS. 9 and 10 may be constantly zero. Then the control process proceeds to step 130.

In step 130, PID compensation calculations for a displacement feedback control are carried out according to the following equations:

$$Cxh = Kpxh \cdot Exh + Kixh \cdot Ixh(n) + Kdxh\{Exh(n) - Exh(n-n1)\}$$

$$Cxp = Kpxp \cdot Exp + Kixp \cdot Ixp(n) + Kdxp\{Exp(n) - Exp(n-n1)\}$$

$$Cxr = Kpxr \cdot Exr + Kixr \cdot Ixr(n) + Kdxr\{Exr(n) - Exr(n-n1)\}$$

$$Cxw = Kpxw \cdot Exw + Kixw \cdot Ixw(n) + Kdxw\{Exw(n) - Exw(n-n1)\}$$

In the above equations, Ej(n) (j=xh, xp, xr, xw) are the current values of Ej and Ej(n−n1) are the values of Ej at a cycle which is n1 cycles preceding the current cycle. When Ij(n) and Ij(n−1) (j=xh, xp, xr, xw) are the current Ij and the one cycle preceding Ij, respectively, they are in the following relation:

$$Ij(n) = Ej(n) + Tx \cdot Ij(n-1)$$

In the above equation, Tx is a time constant. The absolute values of Ij are limited not to exceed Ijmax. Kpj, Kij and Kdj (j=xh, xp, xr, xw) are proportioning, integrating and differentiating constants, respectively.

Then the control process proceeds to step 140. In step 140, calculations for displacement mode reversal conversion are carried out according to the following equations:

$$Pxfl = \tfrac{1}{4} \cdot Kxfl(Cxh - Cxp + Cxr + Cxw)$$

$$Pxfr = \tfrac{1}{4} \cdot Kxfr(Cxh - Cxp - Cxr - Cxw)$$

$$Pxrl = \tfrac{1}{4} \cdot Kxrl(Cxh + Cxp + Cxr - Cxw)$$

$$Pxrr = \tfrac{1}{4} \cdot Kxrr(Cxh + Cxp - Cxr + Cxw)$$

Kxfl, Kxfr, Kxrl and Kxrr are proportioning constants.

Then the control process proceeds to step 150. In step 150, based upon the maps shown in FIGS. 11 and 12 for the longitudinal and lateral acceleration compensations, target pressure values Pgx and Pgy are calculated, and then the control process proceeds to step 160.

In step 160, PD compensation calculations for an acceleration feedback control for the pitch (Cgp) and roll (Cgr) are carried out according to the following equations:

$$Cgp = Kpgp \cdot Pgx + Kdgp\{Pgx(n) - Pgx(n-n1)\}$$

$$Cgr = Kpgr \cdot Pgy + Kdgr\{Pgy(n) - Pgy(n-n1)\}$$

In the above equations, Pgx(n) and Pgy(n) are the current values of Pgx and Pgy and Pgx(n−n1) and Pgy(n−n1) are the values of Pgx and Pgy at a cycle which is n1 cycles preceding the current cycle, respectively. Kpgp and Kpgr are proportioning constants, and Kdgp and Kdgr are differentiating constants.

Then the control process proceeds to step 170. In step 170, denoting the current and one cycle preceding steering angles read in in step 20 in the flowchart of FIG. 3 as Ast(n) and Ast(n−1), respectively, steering angle velocity Ast' is calculated as follows:

$$Ast' = Ast(n) - Ast(n-1)$$

Figure 13:
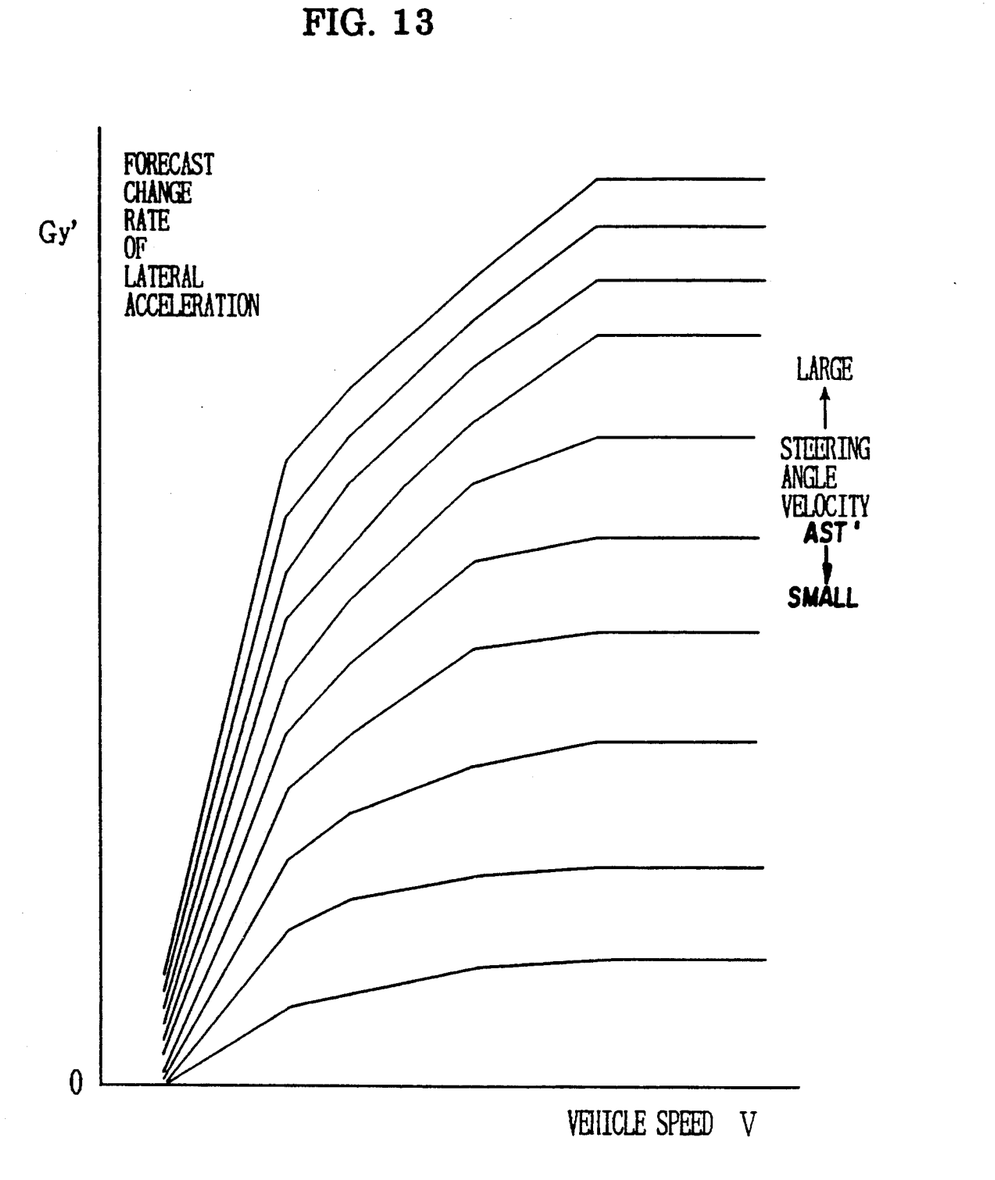
FIG. 13 is a graph showing a relation among the vehicle speed V, the steering angle velocity Ast' and the forecast change rate of lateral acceleration Gy'.

Based upon this Ast' and the vehicle speed V read in in step 20, from the map of FIG. 13, a forecast change rate of lateral acceleration, Gy', is calculated, and then the control process proceeds to step 180.

In step 180, calculations for acceleration mode reversal conversion are carried out according to the following equations:

$$Pgfl = \tfrac{1}{4} \cdot Kgfl(-Cgp + K2f \cdot Cgr + K1f \cdot Gy')$$

$$Pgfr = \tfrac{1}{4} \cdot Kgfr(-Cgp - K2f \cdot Cgr - K1f \cdot Gy')$$

$$Pgrl = \tfrac{1}{4} \cdot Kgrl(Cgp + K2r \cdot Cgr + K1r \cdot Gy')$$

$$Pgrr = \tfrac{1}{4} \cdot Kgrr(Cgp - K2r \cdot Cgr - K1r \cdot Gy')$$

In the above equations, Kgfl, Kgfr, Kgrl and Kgrr are proportioning constants, and K1f, K2f, K1r and K2r are distribution factors among the four vehicle wheels.

Then the control process proceeds to step 190. In step 190, using the standard pressures Pbi stored in ROM and the results of the calculations in steps 140 and 180, the control target pressures Pui for the respective pressure control means are calculated according to the following equation:

$$Pui = Pxi + Pgi + Pbi \quad (i = fl, fr, rl, rr)$$

Then the control process proceeds to step 40 in FIG. 3. Thus, in this embodiment, in step 30 the target pressures Pui for the working fluid chambers of the respective actuators are calculated based upon the results of detection by the various sensors, then in step 40 the compensation amounts ΔPf and ΔPr for the target pressures are calculated based upon the maps shown in FIGS. 6 and 7, then in step 50 the compensated target pressures Pai are calculated by an addition of the compensation amounts ΔPf and ΔPr from the target pressures Pui, and then in steps 60 and 70 the pressures in the working fluid chambers of the respective actuators are controlled to attain the compensated target pressures Pai.

As shown in FIGS. 6 and 7, the compensation amounts ΔPf and ΔPr are substantially zero when the absolute value of the lateral acceleration Gy is less than Gy1 but increases gradually but substantially when the lateral acceleration increases beyond Gy1. As the suspension force generated in each of the actuators according to the control amount calculated for each of the pressure control means is compensated for to be decreased by a compensation amount which increases in its absolute value in the negative sense along with increase of the lateral acceleration, the vertically upward pointed force exerted to the vehicle body by the cornering force is cancelled by the compensation decrease of the vertically upward pointed force exerted by each of the actuators, so that no exaggeration occurs in the attitude control of the vehicle body by the active suspension during a turning of the vehicle.

Although the above embodiment is constructed to be adapted to a vehicle in which a vertically upward pointed force is exerted to the vehicle body due to the cornering force at the vehicle wheel, the present invention may also be applied to a vehicle in which a vertically downward pointed force is exerted to the vehicle body due to the cornering force at the vehicle wheel. In such an application, the compensation amounts ΔPf and ΔPr will show such performance curves that are the turnover of the maps shown in FIGS. 6 and 7 about the abscissa axis of lateral acceleration.

Further, although in the above embodiment the target pressures Pui in the working fluid chambers of the respective actuators are calculated according to particular active suspension calculations, such particular active suspension calculations are not essential to the present invention, and any other active suspension calculations may be employed as long as the target pressures Pui in the working fluid chambers of the respective actuators are controlled to provide a desired attitude of the vehicle body and a riding comfortableness performance of the vehicle.

Further, although in the above embodiment the standard pressures Pbi for the working fluid chambers of the respective actuators are constant values, they may be the pressure in the corresponding working fluid chambers detected by the pressure sensors after the lapse of a predetermined time from the start of the control or may be a mean value of the corresponding pressures during a predetermined lapse of time after the start of the control.

Although the present invention has been described in detail in the above with respect to a particular embodiment thereof, particularly with respect to an embodiment of a hydraulic active suspension, it will be apparent to those skilled in the art that various other embodiments, including those not relying on hydraulic actuators, are possible within the scope of the present invention.

What is claimed is:

1. An active suspension of a vehicle suspending a vehicle body on vehicle wheels with a suspension force generated therein in combination with a suspension mechanism which converts cornering forces acting at the vehicle wheels during a turn of the vehicle to a vertical force exerted to the vehicle body, comprising actuators each provided for each of said vehicle wheels so as to generate said suspension force while increasing or decreasing the height of the vehicle body at a portion thereof corresponding to each of said vehicle wheels, vehicle height detection means each detecting the height of the vehicle body relative to each of said vehicle wheels at a portion thereof corresponding thereto, a lateral acceleration detection means for detecting lateral acceleration of the vehicle body, and a control means for controlling said actuators based upon the detected vehicle body heights and the detected lateral acceleration to obtain a desired attitude of the vehicle body with a modification of said suspension force generated by each of said actuators for compensating for a roll of the vehicle body due to the lateral acceleration thereof, wherein said control means further modifies said suspension force generated by each of said actuators according to the lateral acceleration of the vehicle body so as to change said suspension force generated by each of said actuators in compensation for said vertical force exerted to the vehicle body through said suspension mechanism due to the cornering forces.

2. An active suspension according to claim 1, wherein the active suspension comprises a pressurized source of a working fluid and said actuators are hydraulic actuators, said control means including control valves each controlling a supply of said working fluid from said pressurized source thereof to each of said hydraulic actuators and an exhaust of the working fluid from each of said hydraulic actuators so as to generate said suspension force as controlled while increasing or decreasing the height of the vehicle body at the portion thereof corresponding to each of said vehicle wheels, and wherein said control means modifies the control of said control valves so as to change the pressure supplied to each of said hydraulic actuators in compensation for said vertical force exerted to the vehicle body through said suspension mechanism due to the cornering forces.

3. An active suspension according to claim 2, wherein said control means controls said control valves so as to supply each of said actuators with the working fluid at a pressure which is an addition of a first pressure component calculated based upon the detected vehicle body heights and the detected lateral acceleration to obtain the desired attitude of the vehicle body and a second pressure component calculated to be equivalent to said vertical force due to the cornering forces, provided that said vertical force is negative when pointed vertically upward.

4. An active suspension according to claim 3, wherein said suspension mechanism is a double wishbone type suspension mechanism including a lower arm, and a corresponding one of said actuators is pivotably connected at a lower end thereof with said lower arm.

5. A method of converting, with an active suspension in combination with a suspension mechanism, cornering forces acting at vehicle wheels of a vehicle during a turn of the vehicle to a vertical force exerted to a vehicle body, the method comprising the steps of:
generating, with actuators each provided for each of said vehicle wheels, a suspension force while increasing or decreasing the height of the vehicle body at a portion thereof corresponding to each of said vehicle wheels;

detecting the height of the vehicle body relative to each of said vehicle wheels at a portion thereof;

detecting lateral acceleration of the vehicle body; and controlling said actuators based upon the detected vehicle body heights and the detected lateral acceleration to obtain a desired attitude of the vehicle body with a modification of said suspension force generated by each of said actuators for compensating for a roll of the vehicle body due to the lateral acceleration thereof, wherein said controlling step further comprises the step of modifying said suspension force generated by each of said actuators according to the lateral acceleration of the vehicle body so as to change said suspension force generated by each of said actuators in compensation for said vertical force exerted to the vehicle body through said suspension mechanism due to the cornering forces.

6. A method as claimed in claim 5, wherein the active suspension comprises a pressurized source of a working fluid and said actuators are hydraulic actuators, the method further comprising the steps of controlling, with control valves, a supply of said working fluid from said pressurized source thereof to each of said hydraulic actuators and an exhaust of the working fluid from each of said hydraulic actuators so as to generate said suspension force as controlled while increasing or decreasing the height of the vehicle body at the portion thereof corresponding to each of said vehicle wheels, and modifying the control of said control valves so as to change the pressure supplied to each of said hydraulic actuators in compensation for said vertical force exerted to the vehicle body through said suspension mechanism due to the cornering forces.

7. The method of claim 6, further comprising the step of controlling said control valves so as to supply each of said actuators with the working fluid at a pressure which is an addition of a first pressure component calculated based upon the detected vehicle body heights and the detected lateral acceleration to obtain the desired attitude of the vehicle body and a second pressure component calculated to be equivalent to said vertical force due to the cornering forces, provided that said vertical force is negative when pointed vertically upward.

* * * * *